United States Patent [19]

Dietrich, Sr.

[11] Patent Number: 4,924,946
[45] Date of Patent: May 15, 1990

[54] APPARATUS FOR DEEP PLOWING HIGHLY COMPACTED SOIL

[75] Inventor: William J. Dietrich, Sr., Congerville, Ill.

[73] Assignee: Soycorp, Inc., Congerville, Ill.

[21] Appl. No.: 304,795

[22] Filed: Jan. 31, 1989

[51] Int. Cl.⁵ ............................................. A01B 13/08
[52] U.S. Cl. ................................. 172/382; 172/260.5; 172/699; 172/265
[58] Field of Search ................ 172/196, 40, 484, 474, 172/464, 382, 265, 699

[56] References Cited

U.S. PATENT DOCUMENTS

| | | | |
|---|---|---|---|
| 3,563,316 | 2/1971 | Shatto | 172/40 |
| 4,313,504 | 2/1982 | Fischer | 172/382 |
| 4,336,844 | 6/1982 | Helbig | 172/196 |
| 4,538,689 | 9/1985 | Dietrich, Sr. | 172/700 |
| 4,548,277 | 10/1985 | Dietrich, Sr. et al. | 172/265 |

FOREIGN PATENT DOCUMENTS

| | | | |
|---|---|---|---|
| 699122 | 11/1979 | U.S.S.R. | 172/382 |
| 883276 | 11/1981 | U.S.S.R. | 172/382 |
| 1335133 | 9/1987 | U.S.S.R. | 172/382 |
| 2033192 | 5/1980 | United Kingdom | 172/382 |

OTHER PUBLICATIONS

Pp. 5-6 of proceedings of conference on Deep Tillage Tools.
Kaelble-Gmeinder TLG 12-B Deep Soil Loosener.
Deep Soil Moldboard Plow (German).

Primary Examiner—Richard J. Johnson
Attorney, Agent, or Firm—Emrich & Dithmar

[57] ABSTRACT

Apparatus for deep plowing highly compacted soil includes successively forming troughs of loosened soil immediately adjacent a previously formed trough. After each pass the plow leaves a trough of loosened soil having a transverse vertical profile (called a "fracture profile") in the general shape of a parallelogram with sides inclined upwardly and toward the unplowed ground. Each successive trough is formed by pulling a first set of point plows located on the unplowed side of said successive swath and at a depth of approximately one-half the desired depth to loosen soil in the upper portion of the fracture profile. A second point plow located to the rear of the first plows and at the desired depth is pulled approximately midway of the bottom of the fracture profile to loosen the remaining soil in the lower portion of the fracture profile.

5 Claims, 3 Drawing Sheets

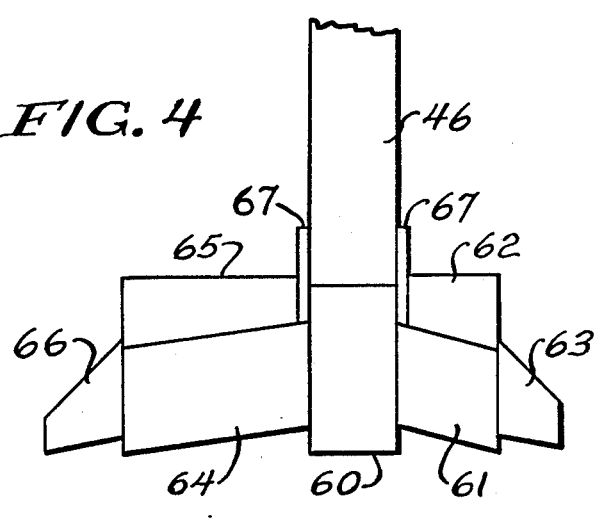
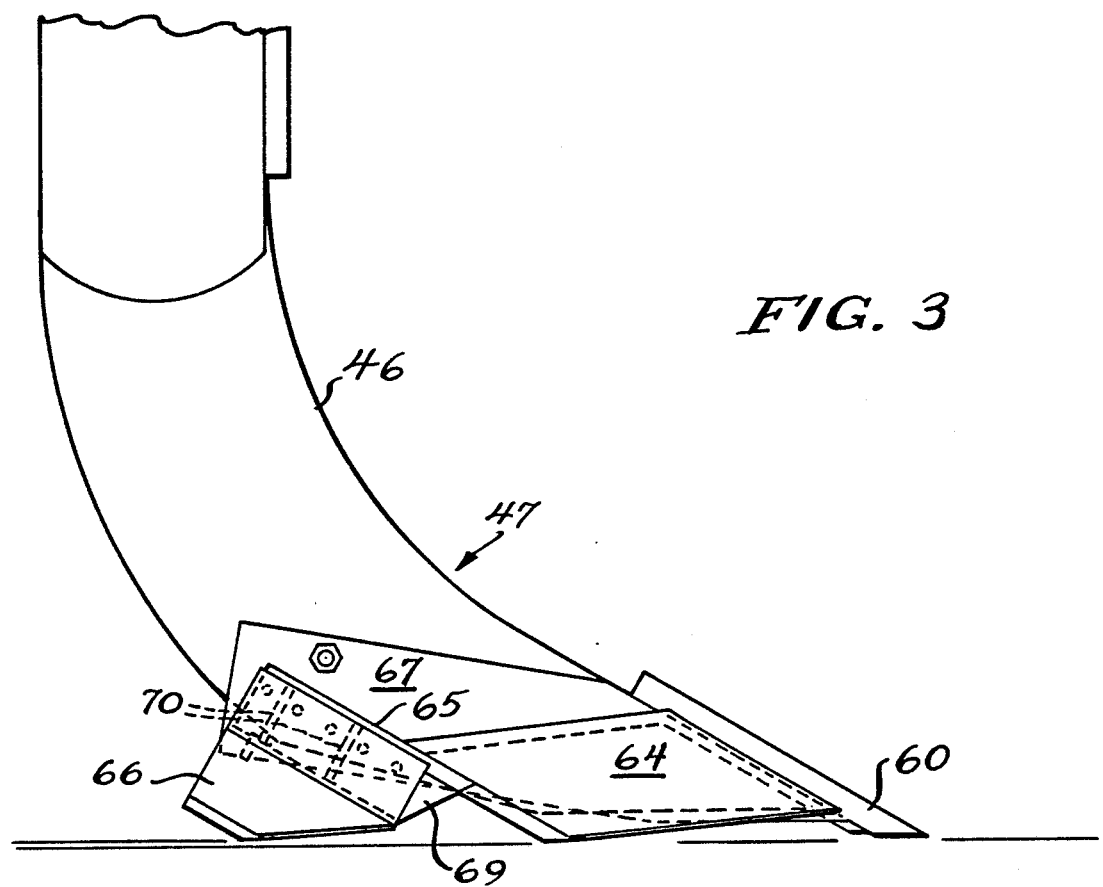

4,924,946

APPARATUS FOR DEEP PLOWING HIGHLY COMPACTED SOIL

FIELD OF THE INVENTION

The present invention relates to a method of soil reclamation which involves plowing or loosening highly compacted soil to a substantial depth. By "substantial" is meant that the soil is loosened to a depth of greater than approximately 30 inches and up to a depth of 48 inches or more. Although the present invention is intended for use in deep plowing of highly compacted soil, it obviously has application for soils of lesser compaction. As used herein, "highly compacted soil" is produced when, after coal is mined from the land, top soil, which previously had been set aside, is brought back to cover the field after the coal is removed. The soil is returned to the field and deposited on the top by individual loads of large earth movers. A fully loaded earth mover may weigh more than 100 tons. Many thousands of loads of soil normally are re-deposited on the surface of the ground to a depth of four feet or more. Thus, heavy, fully-loaded earth mover normally will traverse the re-deposited soil many times causing it to become highly compacted. Such highly compacted soil, of course, does not absorb moisture like normal soil and it does not permit crop development because it prevents root growth.

BACKGROUND OF THE INVENTION

Plowing, of course, has been widely practiced in the agricultural arts for many decades. However, even the deepest agricultural plowing, which is normally done by a moldboard plow, seldom works the soil to a depth greater than 14 inches. Moreover, a moldboard plow is designed to lift the soil and turn it over into a previously formed furrow.

One early attempt at deep plowing of compacted soil was to pull a shank like a rock-ripper with a narrow tooth like a chisel through the soil. Such shanks have the strength to withstand deep plowing, but they simply form slots which does not promote water retention nor loosen the soil for root growth. In fact, the soil is further compacted on the upper walls of the slot formed by a ripper shank.

Another attempt was the slip plow. The slip plow consists of a vertical ripper shank with a plate 10"–15" wide and 10 ft. long attached to the lower rear portion of the shank. The rear portion of the plate is supported by a chain attached to the top of the ripper shank. The plate is pivotally attached to the shank with a horizontal pin, and the chain can be shortened or lengthened to adjust the height of the rear end. As soil flows by the ripper shank it is lifted by the upward slope of the plate. The disadvantage to the slip plow is that it generally plows a narrow bottom V-groove in the soil.

Another deep plow is a large moldboard plow with a shortened moldboard to avoid turning the soil over completely. A large landside is needed to offset the large side draft. This large landside causes considerable drag on the plow, producing heat through friction. Also, substantial side soil movement occurs leaving a large surface furrow when finishing each plowed land. Another deep chisel plow is a vertical ripper shank with relatively small triangular shaped wing. This shank has one, forward, smaller shank mounted on each side operating at a shallow depth. A similar V fracture line of that of the slip plow is accomplished with a claimed reduction in draft.

SUMMARY OF THE INVENTION

The present invention contemplates apparatus for loosening highly compacted soil in a field to a desired depth greater than 30 inches. The terms "plowing" and "loosening" are used interchangeably herein, and they refer to lifting and fracturing the soil rather than turning it over, as in conventional moldboard plowing.

According to the present invention, a first trough of loosened soil is formed. It is not important how the first trough is formed although it may be formed by the disclosed apparatus. As used herein, the term "trough" refers more to a soil profile—that is, the outline of loosened soil produced by a single pass of the plow. The term has no particular relation to the outline of the surface of the soil being worked either before or after plowing. The first trough has the general shape of an inverted trapezoid—i.e., it has V-shaped side walls and a flat bottom so that the sides of the trough extend upwardly from the bottom and outwardly toward unplowed ground on both sides.

After the first trough is formed, successive troughs are formed by pulling the disclosed plow in a pattern much like moldboard plowing—that is the plowed ground is always on the same side of the operator (the right side in the illustrated embodiment). The successive troughs are formed in the shape of a parallelogram extending upwardly and toward unplowed ground at an angle of about 40°–45°. The successive troughs are formed by pulling a first set of point plows which are located on the side of a main frame which is near the unplowed ground. As used herein a point plow is a plow having a parabolic shape, a leading point or chisel, and lateral wings for raising and fracturing the soil. Specifically, it does not include moldboard plows and ripper shanks.

The forward set of point plows is located at a depth of approximately one-half the desired depth of the final trough, and it loosens the soil in the upper portion of desired soil fracture profile. As used herein, a soil "fracture profile" is the outline of loosened soil formed by a single pass of the plow, and formed in a vertical plane transverse of the trough thus formed. Importantly, one of the forward point plows (the one located nearest the unplowed ground) is located in a position so that it loosens the soil on a fracture line on the upper left side of the fracture profile of loosened soil so that a single deep point plow, which is located behind the forward plows and at the desired depth of the soil profile, does not have to lift the soil the entire depth of the fracture profile, but only one-half the depth of the fracture profile.

The point of the rear, deep plow is asymmetrical, but it is designed to be load-balanced. That is, realizing that the fracture profile worked by the rear plow is in the general form of a parallelogram extending upwardly and outwardly toward unplowed ground, the working area on the side of the deep plow point on the plowed side is of a greater area than the working area of the side of the point on the unplowed side. The two working areas are designed taking into consideration the amount of compacted soil they fracture and lift (that is, the amount of work they do), so as to substantially equalize opposing side drafts. This is what is meant when referring to a "load-balanced" point.

In summary, the present invention loosens soil in a fracture profile in the general form of parallelogram extending toward the unplowed ground, the sides of which form an angle of approximately 40°–45° with the horizontal. The work is done by a large implement having a forward, shallow set of point plows located at approximately one-half the desired fracture depth and sufficient to loosen soil in the upper half of the desired profile, followed by a single, deep point plow which has an asymmetrical but load-balanced point to loosen the remaining soil in the lower half of the fracture profile.

The features and advantages of the present invention will be more fully appreciated after a deeper understanding is obtained of the invention from the attached drawing wherein identical reference numerals will refer to like parts in the various views.

BRIEF DESCRIPTION OF THE DRAWING

FIGS. 3 and 4 are close-up fragmentary side and front views of the point of the deep plow of FIG. 1.

DETAILED DESCRIPTION OF THE PREFERRED EMBODIMENT

Figure 1:
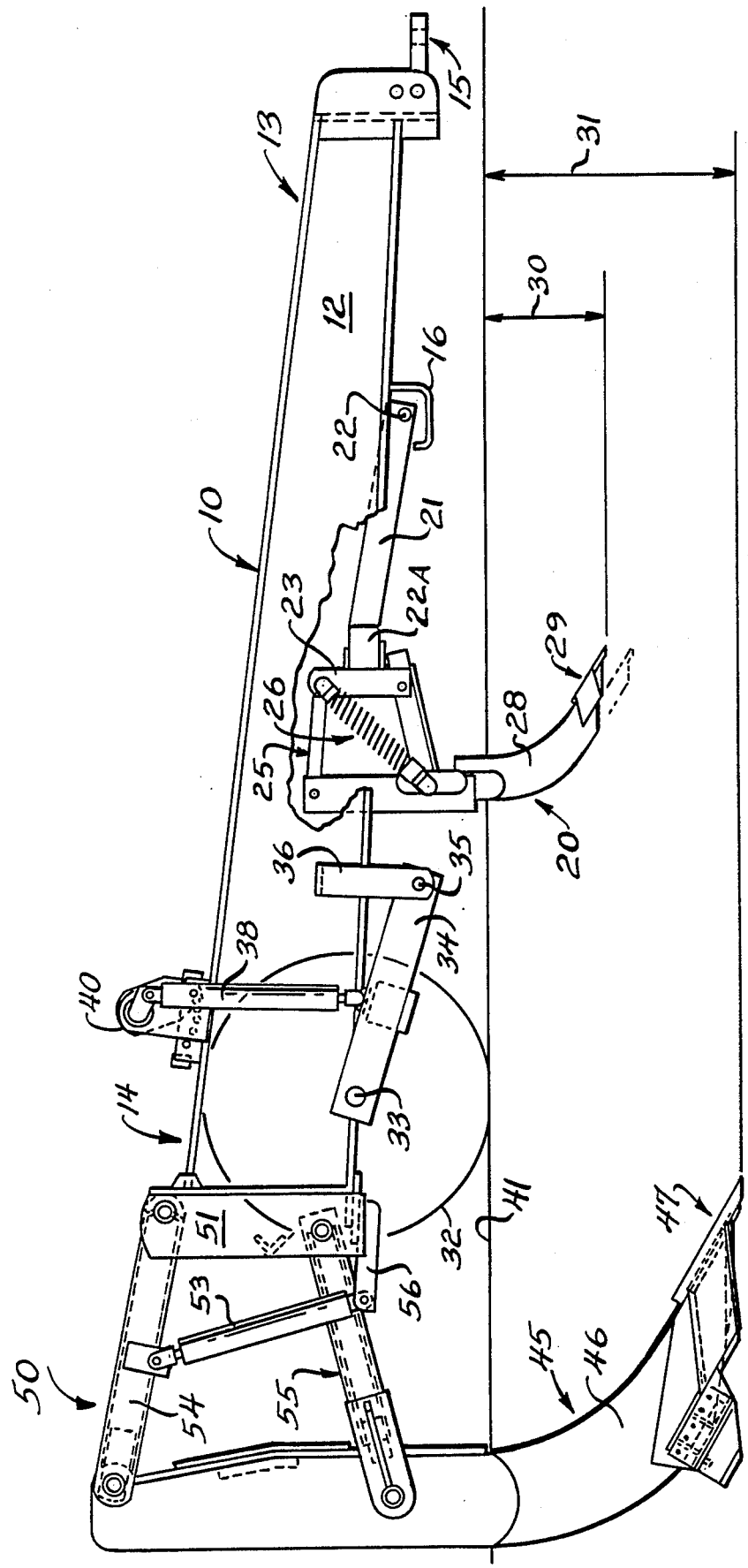
FIG. 1 is a right side view of an implement used to practice the method of the present invention.

Turning first to FIG. 1, reference numeral 10 generally designates an implement frame in the form of an elongated beam 12 having an increasing depth proceeding from the front 13 to the rear 14. At the front of the frame 12 there is a conventional hitch 15 adapted to receive a hitch pin to couple the front of the plow frame 12 to a conventional traction vehicle. In this case, because of the large amount of traction power required to effect deep plowing of compacted soil, the hitch 15 may typically be attached to a continuous metal track tractor, such as a CATERPILLAR D-9 tractor.

Beneath the beam 12 toward the front of the plow, there is a transverse mounting bar 16. As in agricultural equipment, the terms "right" and "left" refer respectively to the right and left sides of an operator seated in the tractor and facing the direction of travel. Beam 12 is partially broken away to show the forward point plows. In the illustrated embodiment, the bar 16 extends to the left side of the beam 12, transverse to the direction of travel. Mounted to the bar 16 are two point plows, one of which is seen in FIG. 1 and generally designated 20. The point plows 20 may be of a conventional design, such as for chisel plows or the like, but they preferably are designed to lift and fracture soil and not turn it over to the side, like a moldboard plow. The point 20 is mounted to the bar 16 by means of a rearwardly-extending beam 21 which is pivotally mounted at 22 to the transverse bar 16. At the rear of the beam 21 there is a shorter transverse member 22A to which is mounted a vertical member 23 which is part of a four-bar linkage 25 for mounting the point plow 20. A conventional reset mechanism generally designated 26 may be incorporated in the four-bar linkage 25 for permitting the point plow 20 to raise in the event that it strikes an obstacle. Because large boulders may be encountered and even raised out of the soil by the point plow 20, the entire structure may rotate about pivot 22 to provide an even greater clearance than normal.

The point plow 20 is mounted to a curved or parabolic shank 28. By "parabolic", it is meant that the shank 28 extends downwardly and forwardly in a curved fashion to reduce stress at sharp turns. The point plow 29 may be of the design shown in my U.S. Pat. No. 4,538,689. As mentioned, the term "point plow" refers to a plow unit having a main point or chisel and wings or equivalent for lifting and fracturing the soil, but not necessarily for turning the soil over or for forming a furrow in the upper surface of the soil. In particular, a point plow may be of the type used in chisel plows or the like for fracturing the soil at a desired depth and for lifting and breaking the soil above. The reset mechanism 26, not shown in detail, may be of the type shown in U.S. Pat. No. 4,548,277. Additional reset means, such as the hydraulic one described further below, may also be incorporated to return reset beam 21. When an obstruction is encountered by the point, the shank 28 is permitted to raise and to rotate slightly counterclockwise as the two horizontal arms of the four-bar linkage 25 are permitted to elevate and rotate about their respective forward pivotal connections. The forward point plows 20, which may be identical to one another, are set to operate at a depth of approximately one-half the desired depth of the final trough, as illustrated by the vertical arrow 30 in FIG. 1, the overall desired depth of the final trough being designated by the vertical arrow 31.

The frame is supported by two ground wheels, one on either side. The right side support wheel is diagrammatically illustrated at 32. It has its axle 33 mounted to a wheel arm 34, the forward end of which is pivotally mounted at 35 to a vertical bracket 36 mounted to the frame 10. A hydraulic cylinder 38 is connected between the wheel arm 34 and a mounting bracket 40 mounted on top of the frame 10 to adjust the operating depth of the implement. As the hydraulic cylinder 38 is extended, the frame is raised because the wheel 32, of course, rests on the ground as represented by the horizontal line 41, to adjust the height of the frame 10 relative to the ground.

Centrally located at the rear of the main frame 12 is a deep point plow generally designated 45 and including a parabolic shank 46 and a point generally designated 47, the point 47 of the deep point plow will be described in more detail below. The shank 46 is mounted by means of a four-bar linkage generally designated 50 to a vertical member 51 mounted to the rear of the frame 12. The four-bar linkage 50 also includes a trip mechanism including a pair of hydraulic cylinders, one of which is seen at 53.

The rod end of hydraulic cylinder 53 is connected to the upper link 54 of the four-bar linkage 50 and the butt end of the cylinder 53 is mounted to a rigid extension 56 attached to the frame 10 beneath the upright member 51. If an obstruction is encountered, the links 54, 55 will rotate in a clockwise direction as seen in FIG. 1 about their respective forward pivots, thereby causing the cylinder 53 to elongate and forcing oil out of the rod end of the cylinder. When the oil pressure in the rod end of the cylinder exceeds a predetermined threshold as determined by a conventional by-pass valve, the oil flows through the by-pass valve and into the butt end or piston end of the cylinder 53. To reset the deep plow, the tractor operator moves an hydraulic control lever near the operator's station on the tractor to retract the cylinder 53. The second cylinder similar to the one 53 may be located on the other side of the four-bar linkage 50, if desired.

Turning now to FIGS. 3 and 4, the deep point 47 is seen in greater detail. It includes a chisel or nose plate 60. On the left side of the shank 46 (i.e., the right side of FIG. 4) is a wing 61, a rear lift plate 62 and a secondary wing 63 located outboard of the forward wing 61 and to the rear of the forward wing. Similarly, on the right side of the shank 46 (that is, on the left side in FIG. 4), there is located a forward wing 64, followed by a rear lift plate 65 and secondary rear wing 66.

The wings 61 and 64, the lift plate 62, 65 and the secondary wings 63, 66 are similar in shape and function except that, as will be observed from FIG. 4, the corresponding elements on the left side of a shank 46 (that is, elements 61, 62 and 63) have a lesser work area (that is, if the element is projected onto a forward transverse vertical plane, the corresponding projected area is referred to as the work area) for reasons to be described below. However, as mentioned, the shape and function of the corresponding elements is similar.

Thus, returning to FIG. 3, the wing 64 extends outwardly to the right side of the shank 46 and it is inclined upwardly and rearwardly at an angle of approximately 30°.

Mounting plates 67 are mounted to either side of the shank 46 for supporting both the point 60 and the forward or primary wings 61, 64. A mounting plate 69 is supported by laterally extending members 70 so that it is located behind the outer edge of the primary wing; and the secondary wing 66 is bolted to the mounting plate 69. A brace 71 is attached to corresponding ones of the rear lateral members 70 for stability. The outer edges of the primary wings 61, 64 are braced by the soil lift plates 62, 65. Thus, the wings and lift plates are designed for extremely heavy duty in view of the environment in which they operate.

Referring to FIG. 3, the nose point 60 is designed to fracture the soil, and the primary or forward wings, 61, 64 lift the soil without any significant turning action. The soil lift plates 62, 65 receive soil flowing over the forward wings 61, 64 and provide a second lift or jolt to further lift and fracture soil flowing over the primary wings. The secondary wings 63, 66 extend laterally and rearwardly similar to the primary wings, but they displace soil at outer lateral reaches than is provided by the forward wings.

Figure 2:
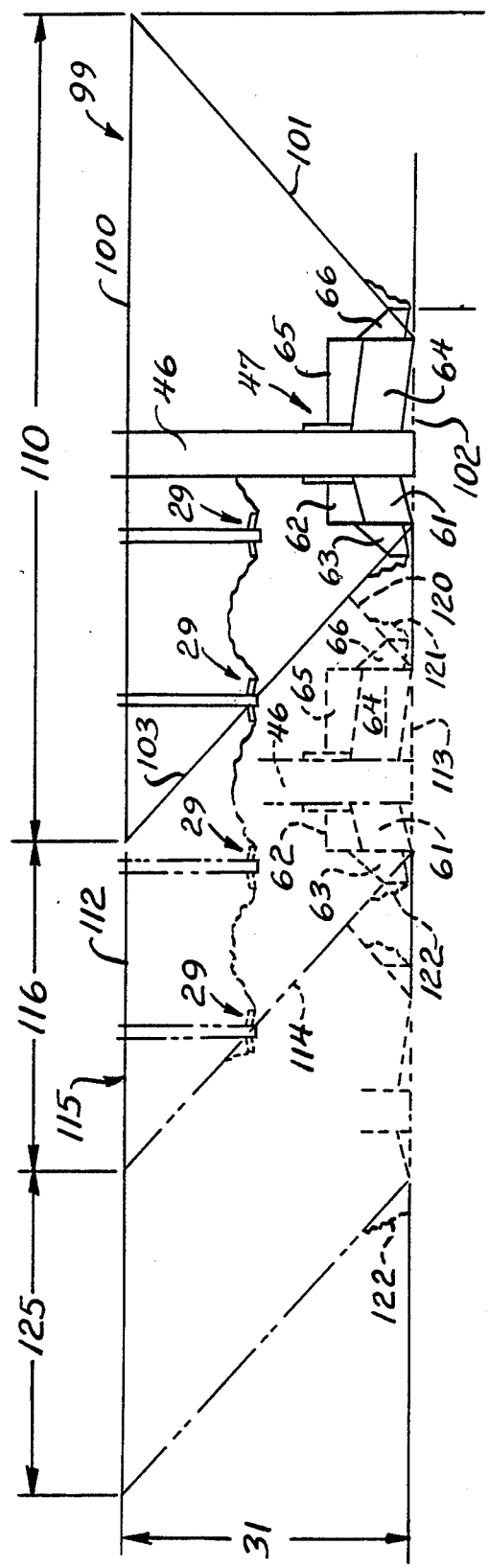
FIG. 2 is a diagrammatic view taken in a vertical plane and looking in the direction of travel of the implement of FIG. 1 which illustrates the method of the present invention.

Turning now to FIG. 2, the method of loosening soil in a field using the implement disclosed is illustrated. FIG. 2 is taken along a vertical plane transverse to the direction of travel of the tractor, which moves into the plane of the page of FIG. 2. The two shallower, forward point plows 29 are located at a depth represented by arrow 30 approximately one-half the desired depth which is again represented by reference numeral 31. Moreover, the point plows 29 are on the left side of the main frame (the center line of which is approximately aligned with the center line of shank 46). In order to start plowing a field, a first trough is formed having the general shape of an inverted trapezoid, as represented by the upper horizontal line 100, the right line 101, line 102 and line 103 in FIG. 2. The lines 100-103 are, of course, idealized since soil does not fracture along such straight lines. However, they do serve to illustrate the fracture profile of the first trough. The first trough which is generally designated by reference numeral 99 has an upper width represented by reference numeral 110. By way of example, the width 110 may be eight feet. The forward point plows may be spaced at two feet apart and a depth of two feet.

The first trough 99 is not normally formed in a single pass, but may be formed in two or more passes of progressively deeper operating depth. After the first trough, all succeeding troughs are formed in a single pass, and they have a fracture profile of parallelogram form extending upwardly and outwardly toward unplowed ground. For example, in FIG. 2, the fracture profile of the second trough is defined by the horizontal upper line 112, previously described line 103, the lower horizontal line 113 and an inclined line 114. By the time the second trough, generally designated 115, is formed, the soil in the first trough 99 will be loosened. It is significant to note that the left side fracture line (i.e., line 103, which is sometimes referred to as the line between the trough being plowed and unplowed soil) extends upwardly and toward unplowed ground at an angle in the range of 40°-45° relative to the horizontal. The width of the second trough, and all successive troughs, in the exemplary embodiment is approximately 48 inches, as represented by 116. When forming the second trough, the right wheel 32 may ride in the furrow formed on the previous pass by the shank 46.

When the second trough 115 is formed, the shallow, forward point plows 29 loosen soil in the upper portion of the second profile 115, and it is important that the left shallow point plow 29 fracture soil along the desired fracture line 114 so that the deep point plow located to the rear does not have to fracture soil all the way up to the surface 112. Rather, the deep plow has the shank 46 located such that the lateral extension of the point 47 works substantially all of the bottom of the second profile 115. The soil above the right side wings 64, 66 and the right side soil lift plate 65 has already been partially broken, so the resistance to those elements is lesser than for the corresponding left side primary wing 61, secondary wing 63 and soil lift plate 62. The design, size and shape of the right side elements take into consideration the resistance or "load" on those elements in relation to the corresponding load on the left side elements (which encounters much greater resistance) so that the overall operation of the deep plow point is load-balanced—that is, such that there is substantially no side draft or twisting movement on the shank 46 of the deep plow point. In other words, the work area of the elements on the plowed (right) side of the shank is designed in relation to the work area of the elements on the unplowed (left) side of the shank such that there is little or no side draft or twisting moment on the deep plow.

It will also be observed from FIG. 2 that the outboard ends of the secondary wings 66, 63 loosen the soil along the lower portion of the profile, namely line 113. The primary wing 64 is designed to fracture soil along the idealized dashed line 120, and the secondary wing will continue to fracture soil as represented by broken line 121 so that very little soil is left unplowed after the deep plow point passes. A similar fracturing action on the deep soil is effected by the other secondary wing 63, into the next trough, as represented by the irregular line 122.

As viewed in FIG. 2, the plowed soil is located to the right of all passes after the first pass, and the unplowed soil is always located to the left when traveling in a direction into the plane of the page. As in moldboard plowing, after the plow goes to one end of the field, it returns and plows ground on the right side of the trough 99, but in a direction out of the plane of the page of FIG. 2. Thus, the plowed ground is always to the right of the operator for the illustrated embodiment and the unplowed ground is always to the left of the operator. A mirror image of the illustrated system could be implemented to reverse the sides on which the plowed and unplowed grounds lie.

The third pass or trough generally designated by reference numeral 125 is formed after the second trough 115 and, once more, by moving the plow into the plane of the page of FIG. 2. All subsequent troughs are plowed in a manner similar to that described in connection with the second trough—that is, the profile of the trough is generally in the form of a parallelogram which extends upwardly and toward the unplowed ground with the left side of the fracture profile being a line (the line 114 in FIG. 2) which extends at an angle of approximately 40°-45° relative to the horizontal.

Having thus disclosed in detail a preferred embodiment of the invention, persons skilled in the art will be able to substitute certain of the structure which has been illustrated and to modify the steps described while continuing to practice the principle of the invention; and it is, therefore, intended that all such modifications and substitutions be covered as they are embraced within the spirit and scope of the appended claims.

I claim:

1. Apparatus for loosening compacted soil in a field to a desired depth greater than approximately thirty inches, said apparatus comprising: a main beam extending generally in the direction of travel; a transverse beam mounted intermediate the ends of said main beam and extending transverse of the direction of travel; a first plow point; means including a first curved shank for mounting said first point plow on the unplowed side of said transverse beam; a second plow point, means including a second curved shank for mounting said second point plow to said main beam, said second point plow having a chisel at the nose thereof, first and second forward wings extending laterally and toward the rear and inclined rearwardly and upwardly to lift and fracture soil, first and second soil lift plates respectively behind said first and second wings for further lifting soil passing over said first and second wings, and first and second rear wings located behind said first and second forward wings respectively and extending laterally thereof for further working soil beyond the lateral reach of said forward wings and adjacent the bottom of said fracture profile; said apparatus forming along a first swath a first trough of loosened soil to the desired depth and thereafter successively forming a plurality of troughs of loosened soil adjacent said first trough, each successive trough being formed immediately adjacent a previously formed trough and having a transverse vertical fracture profile of unplowed soil in the general shape of a parallelogram having sides inclined upwardly and toward the unplowed ground, each successive swath being formed by pulling said first point plow located on the unplowed portion of said successive trough and at a depth of approximately one-half said desired depth to loosen soil in the upper portion of said fracture profile, and by further pulling said second point plow located to the rear of said first point plow at said desired depth to loosen the remaining soil in the lower portion of said fracture profile.

2. The apparatus of claim 1 wherein the line of said fracture profile between the trough being plowed and unplowed soil extends upwardly and outwardly toward unplowed soil at an angle of approximately 40°-45° relative to the horizontal.

3. The apparatus of claim 1 further comprising a further one of said first point plows and means mounting said further first point plow on the unplowed side of said transverse beam, the outboard one of said first point plows being located to loosen soil in the upper portion of said fracture profile along the upper portion of a line between the trough being plowed and unplowed soil.

4. The apparatus of claim 3 wherein said mounting means for each of said first (forward) point plows includes a rearwardly extending mounting beam pivotally mounted to said transverse beam for vertical motion about said pivot mount; a four bar linkage for mounting the shank thereof to said rearwardly extending beam; and a reset mechanism permitting said shank to raise vertically under action of said four bar linkage when the point thereof encounters an obstruction, and for resetting said shank to plowing position when said point clears said obstruction.

5. The apparatus of claim 1 wherein said deep plow is characterized in that the work area of the elements on the unplowed side of said shank is smaller than the work area of the elements on the plowed side of said shank and the respective areas are designed such that the side draft on said deep plow is substantially reduced under normal operating conditions.

* * * * *